Dec. 1, 1925.

R. N. EHRHART

HEATER FOR LIQUIDS

Filed July 14, 1920

1,564,051

Inventor
R. N. Ehrhart
By Bakewell, Byrnes Parmelee
his Attorneys

Patented Dec. 1, 1925.

1,564,051

UNITED STATES PATENT OFFICE.

RAYMOND N. EHRHART, OF PITTSBURGH, PENNSYLVANIA, ASSIGNOR TO ELLIOTT COMPANY, OF PITTSBURGH, PENNSYLVANIA, A CORPORATION OF PENNSYLVANIA.

HEATER FOR LIQUIDS.

Application filed July 14, 1920. Serial No. 396,277.

*To all whom it may concern:*

Be it known that I, RAYMOND N. EHRHART, a citizen of the United States, residing at Pittsburgh, Allegheny County, Pennsylvania, have invented a new and useful Improvement in Heaters for Liquids, of which the following is a full, clear, and exact description, reference being had to the accompanying drawings forming part of this specification, in which—

Figure 1:
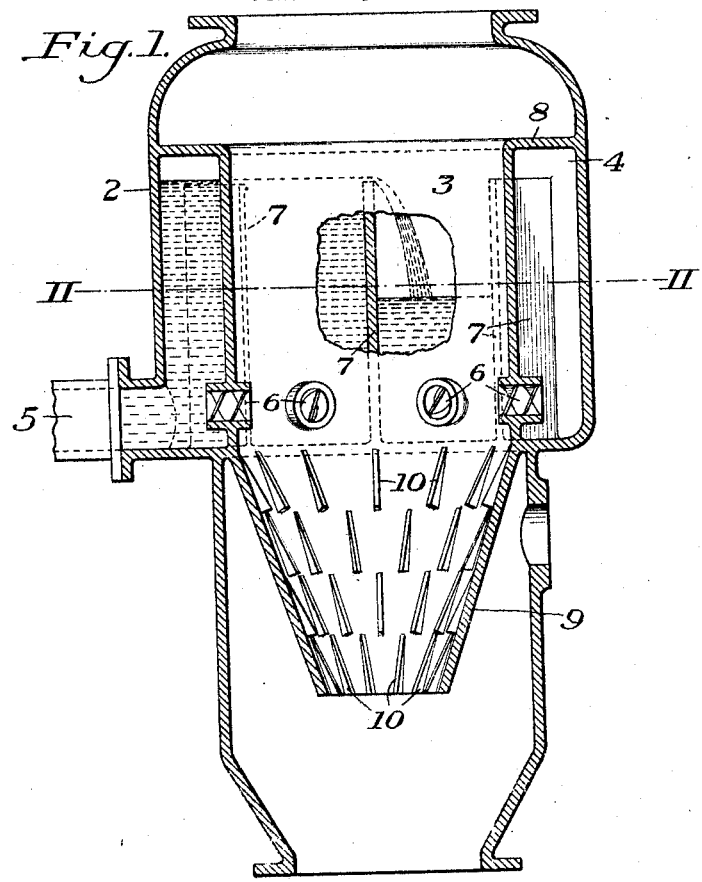
Figure 2:
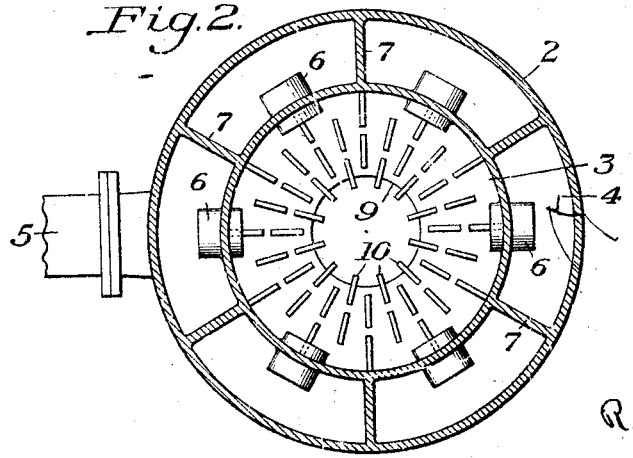

Figure 1 is a central vertical section of one form of heater embodying my invention, and Figure 2 is a section on the line II—II of Figure 1.

My invention has relation to heaters for liquids; and more particularly to heaters of that class in which steam is used as the heating medium.

The invention is particularly applicable for heating feed water for boilers by the use of exhaust steam, but is not limited thereto.

The feed water heaters heretofore in use, with which I am familiar, are bulky in construction and many of them are quite inefficient. Condensers of the jet or open type are usually much smaller and relatively much less expensive then other water heating apparatus when compared on the basis of the amount of heating which is done; but jet condensers, as a rule, are efficient as heaters only when handling relatively large quantities of water.

In practice it is necessary that feed water heaters shall function properly when supplied with amounts of water varying from practically nothing up to their full rating. For this reason the jet condenser principle is not suitable when applied to feed-water heating, inasmuch as their spraying devices will not act to properly mix water with the steam when operating with small amounts of water.

In feed-water heaters recourse is had to cascades, trays, and various other means for the production of relatively thin sheets or films of water, so that even with a relatively small quantity of water passing through the heater, a very large amount of surface is presented for the heating medium to act upon irrespective of the rate of flow through the heater.

My invention is designed to utilize the principle and general construction of a jet condenser for the purpose of heating liquids; and to provide a heater of this character which will operate efficiently notwithstanding maximum variations in the volume of water going through the heater.

Referring to the accompanying drawing in which I have shown a preferred form of my invention, the numeral 2 designates the body of a heater which is similar in general form to an ordinary jet condenser, and which is provided with a mixing chamber 3 surrounded by a water supply chamber 4, having a supply connection 5. 6 designates a series of jets for spraying the water from the chamber 4 into the mixing chamber.

In accordance with my invention, instead of forming the chamber 4 in continuous annular form, I subdivide said chamber into a plurality of separate compartments by means of radially arranged partitions 7. These partitions extend upwardly from the bottom wall of the water chamber to a point near the top wall 8, but terminate sufficiently below said top wall to permit of an overflow above their upper edges from one compartment to another in series.

Water or other liquid to be heated being admitted to one of the compartments from the connection 5, first fills that compartment and then overflows into the adjacent compartments, and so on, the number of compartments filled in any case depending upon the volume of water flowing through the heater. It will be evident that each of the compartments into which the water flows, except possibly the last ones containing water, must be uniformly filled, thereby establishing a constant predetermined head upon the spray nozzle 6 of that compartment, irrespective of the total volume of flow. If the flow is increased, more of the compartments will be filled, while if the flow is decreased, a lesser number of compartments will be filled. It may happen that the amount of water flowing into the last filled compartment will not be sufficient to give the proper head on the nozzle of that compartment. I, therefore, prefer to provide the mixing chamber 3 with a downwardly converging continuation 9 having its inner wall provided with a plurality of lugs or fins 10. The latter are for the purpose of receiving any water that may drop from the nozzles in an undivided state and cause it to flow thereover in a manner to effectively break it up into separate streams. It is necessary to have only a limited amount of such supplemental means for breaking up the water, since the great bulk of the water is effectively broken up by the spray nozzles. In fact, the lugs or fins may be regarded purely as supplemental means to take care of any improper spraying effect that may exist at the last spray nozzle of the operating series of nozzles.

The advantages of my invention will be apparent, since it provides a simple and effective form of heater capable of operating efficiently under widely varying conditions of liquid flowing therethrough. It is well known that by spraying water into steam in a mixing chamber, a very effective heating action is obtained. My invention insures that at all times the liquid to be heated will be adequately mixed with the steam.

It will be readily understood that my invention is not limited to the particular form of heater which I have herein illustrated and described, but that various changes can be made in the form and arrangement of the mixing chamber, and of the series connected supply chambers; and that different forms and arrangements of spray nozzles may be used.

I claim:

1. A liquid heater, comprising a mixing chamber, means for admitting steam thereto, a series of spray nozzles arranged to discharge into said chamber, and means for maintaining certain of said nozzles out of operation until a predetermined operation of the remaining nozzles has been insured, substantially as described.

2. A liquid heater, comprising a mixing chamber, means for admitting steam thereto, a series of spray nozzles arranged to discharge into said chamber, and means whereby a greater or less number of said nozzles may be used, depending upon the volume of flow through the heater, said means insuring a predetermined head on certain of the nozzles which are in operation, substantially as described.

3. A water heater, comprising a mixing chamber, means for admitting steam thereto, a plurality of progressively operable spray nozzles arranged to discharge into said chamber, and means insuring a constant head or pressure at all times at at least some of said nozzles, which are in operation before additional nozzles can be brought into operation, substantially as described.

4. A water heater, comprising a mixing chamber, means for admitting steam thereto, a plurality of spray nozzles arranged to discharge into said chamber, together with a separate supply chamber for each of said nozzles and a water supply so positioned as to completely fill one of said chambers before any of the other chambers are brought into operation, substantially as described.

5. A water heater, comprising a mixing chamber, means for admitting steam thereto, a plurality of spray nozzles arranged to discharge into said chamber, together with a separate supply chamber for each of said nozzles, said supply chambers being arranged to overflow from one to another in series, substantially as described.

6. A water heater comprising a mixing chamber, means for admitting steam thereto, a plurality of spray nozzles arranged to discharge into said chamber, and a plurality of supply compartments arranged around the mixing chamber, and communicating with each other at their upper portions only, substantially as described.

7. A water heater, comprising a mixing chamber, means for admitting steam to said chamber, a plurality of spray nozzles arranged to discharge into said chamber, means for supplying water individually to each of said nozzles, means for insuring a predetermined head or pressure at at least the majority of said nozzles when more than three of said nozzles are in operation, and supplemental means for further breaking up the liquid into a divided state, substantially as described.

8. In a water heater, a mixing chamber, means for admitting steam to said chamber, there being a plurality of individually supplied openings arranged to discharge the water to be heated into said chamber, means for insuring a predetermined head of pressure at at least the majority of said openings when more than three of said openings are operative, and means supplemental to said openings for breaking up the liquid into a divided state, said supplemental means being located below said openings, substantially as described.

9. A liquid heater, comprising a mixing chamber, means for admiting steam thereto, a series of spraying means arranged to discharge into said chamber, and means for admitting the liquid to be heated successively to said spraying means in accordance with the volume of liquid flowing through the heater at such time, together with supplemental means located below said spraying means for further breaking up the liquid to be heated, substantially as described.

10. In a liquid heater, a mixing chamber, means for admitting steam thereto, there being a series of spraying means having their axes in a common horizontal plane to discharge into said chamber, and means for admitting the liquid to be heated successively to said spraying means in accordance with the volume of liquid flowing through the heater at such time, substantially as described.

11. In a water heater, a mixing chamber, means for admitting steam to said chamber, a liquid spraying device having a series of openings arranged to discharge into said chamber, each of said openings having an individual liquid supplying means, and means independent of said openings for breaking up the liquid supplied therethrough, substantially as described.

12. In a heat exchanger, a heating chamber having means for admitting steam thereto, there being a plurality of liquid inlets to said chamber and means for successively and automatically bringing said inlets into operation, substantially as described.

13. In a heat exchanger, a heating chamber having means for admitting steam thereto, there being a plurality of liquid inlets to said chamber, and means adapted to successively bring said inlets into operation, substantially as described.

14. In a heat exchanger, a heating chamber having means for admitting steam thereto, a plurality of liquid spraying means having their axes in a common horizontal plane and arranged to discharge into said chamber, and means for successively varying the number of said spraying means in operation in accordance with the volume of liquid flowing through the exchanger, substantially as described.

15. In a liquid heater, a mixing chamber, a plurality of separate supply chambers, means for successively supplying liquid to said supply chambers, and spraying means for conducting liquid from each of said supply chambers to the mixing chamber.

In testimony whereof I have hereunto set my hand.

RAYMOND N. EHRHART.